J. E. HOSMER.
GRAVITY WALKING HAND CULTIVATOR.
APPLICATION FILED APR. 4, 1921.

1,411,435.

Patented Apr. 4, 1922.

WITNESSES.
A. G. Townly
J. W. Harrell

INVENTOR.
John E. Hosmer

UNITED STATES PATENT OFFICE.

JOHN E. HOSMER, OF SILVERTON, OREGON.

GRAVITY WALKING HAND CULTIVATOR.

1,411,435.   Specification of Letters Patent.   Patented Apr. 4, 1922.

Application filed April 4, 1921. Serial No. 458,441.

*To all whom it may concern:*

Be it known that I, JOHN E. HOSMER, a citizen of the United States, residing at Silverton, county of Marion, and State of Oregon, have invented certain new and useful Improvements in Gravity Walking Hand Cultivators, of which the following is a specification.

My invention relates to gravity walking hand cultivators. The object of this invention is to provide a hand cultivator, especially adapted for garden use; that will cultivate deep or shallow; do the work easily; do it well, with very little adjustment, without tramping down the cultivated ground; adjustable to all kinds of soil, without the use of bulky, awkward and untested weights and weight boxes; usable either side up, so as to give double or two kinds of service, without adjustment of the handles, shovels or any of the other parts; and that cultivates without the operator using any force whatever excepting to guide the machine and to propel it forward.

Figure 1:
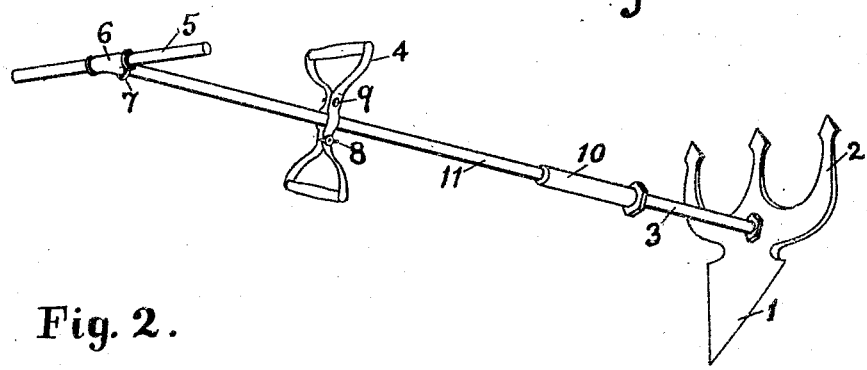
Figure 2:
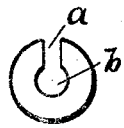
Figure 3:
Figure 4:
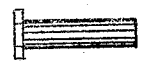
Figure 6:
Figure 5:
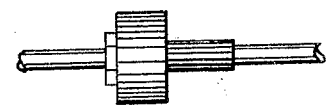

In the accompanying drawings: Fig. 1 is a perspective view of the invention showing one of the best double tools or blades attached to the pole. Fig. 2 is one of the cast metal weights used when the ground is hard. Fig. 3 is the double center-handle. Fig. 4 is the metal ferrule, with flange, on which the weight is used when extra weight is needed. Fig. 5 gives a better view of the double tool or blade. Fig. 6 shows a sectional part of the pole with ferrule and one metal weight resting thereon.

Referring to Fig. 1, which shows the machine ready for use in ordinary garden ground, 1 is the diamond-shaped part of one of the most useful blades and 2 is a composite part of the same blade. These different parts are used at will by simply turning the machine over. 3 is the pole which is made of a round, metal tube of proper length to allow the operator to walk forward with one hand on the double center handle 4 and the other hand on the front handle 5. The front handle 5, preferably made of wood turned to proper shape to fit the hand, is attached to the pole by driving it into a T as shown at 6 and screwed onto the pole as shown at 7. The blade 1—2 is used at right angles to this end handle. The double center handle is shown at 4 and is clamped to the pole by means of bolts through the metal sides and tightened at will by thumb nuts at 8 and 9. The position of this center handle on the pole determines the depth of the cultivation. The metal ferrule with flange is rigidly fitted to the pole at 10 and one (or more) of the cast metal weights shown in Fig. 2 can be slipped on to the pole at 11 through the slot marked "*a*" in Fig. 2 and the opening "*b*" dropped onto the ferrule where it rests on the flange, and the slot "*a*", being narrower than the diameter of the ferrule, prevents the weight from coming off until lifted off of the ferrule to 11 when the pole passes through the slot "*a*". The weight (Fig. 2) can be cast heavier or lighter and as many weights used as desired, the amount necessary being according to the hardness of the ground cultivated. The average of each weight, by actual test, being preferably about five pounds the very hardest ground cultivatable requiring three weights. This gives the operator the advantage of using the machine in all kinds of soil and that too without using any of his energy in putting the blade into the soil. Fig. 5, shows only one form of blade or device but many kinds can be used to suit different kinds and conditions of soil, the machine being adaptable to the use of blades, shovels, harrows, plows and all the various forms of tools used in cultivating.

Having thus described my invention, what I claim as new, and desire to secure by Letters Patent, is:—

1. In a gravity walking hand cultivator, the combination of a pole and one or more metal weights carried by the pole, an opening being in said weight, fitting it to a ferrule rigidly fixed to said pole.

2. In a gravity walking hand cultivator, the combination of a pole and metal weights, to be used singly, or otherwise, according to the hardness of the soil being cultivated, easily attachable and detachable to the said pole by means of a ferrule rigidly fixed to said pole, and of a double center handle attached to said pole, making the implement usable either side up without any change of the said center handle.

In testimony whereof, I hereunto affix my signature in presence of two witnesses.

JOHN E. HOSMER.

Witnesses:
T. P. RISTIEQUE,
IDA S. LOE.